3,234,176
STRESS-CRACK RESISTANT POLYETHYLENE
COMPOSITIONS
George L. Bata and Jack W. Donaghy, Montreal, Quebec, Canada, assignors to Union Carbide Canada Limited, Ontario, Canada, a corporation of Toronto
No Drawing. Filed Dec. 3, 1959, Ser. No. 856,914
12 Claims. (Cl. 260—38)

This invention relates to improvements in the stress-crack resistance of ethylene polymers.

Normally solid polymers of ethylene in molded or extruded form when subjected to prolonged stress, and particularly when in contact with certain compounds, will suddenly crack after a given length of time. Such failure has been variously referred to as "embrittlement," "stress-corrosion," "notch-bend resistance," "crazing" and "environmental stress-cracking." For purposes of brevity and consistency, the term "stress-cracking" will be hereinafter employed as a preferred descriptive term for this phenomenon.

Among the compounds recognized as being active environment for causing stress-cracking of polyethylene subjected to prolonged stress are aliphatic and aromatic liquid hydrocarbons, alcohols, organic acids, ester-type plasticizers, vegetable oils, animal oils, mineral oils, metallic soaps, sulfated and sulfonated alcohols, alkanolamines, polyglycol ethers, sodium and potassium hydroxide, certain rubbers and silicone fluids; cf. De Coste, Malm and Wallder, "Industrial and Engineering Chemistry," 43, 117–121 (1951).

It has been proposed to improve stress-cracking resistance of polyethylene by incorporating therein minor amounts of polyisobutylene or butyl rubber. Such modifiers offer only limited improvement and with increasing concentration tend to seriously reduce the rigidity of the polyethylene.

It has now been found that without impairment to rigidity, the stress-cracking resistance of a normally solid polyethylene is unexpectedly increased which can be up to several thousandfold in many instances by incorporating in the polyethylene relatively small amounts of a drying oil-soluble phenolic resin, together with either a pigmenting amount of carbon black or a stabilizing amount of an antioxidant for the polyethylene, or both carbon black and antioxidant.

Neither the individual nor conjoint addition of carbon black and an antioxidant in the absence of the phenolic resin effect significantly the stress-cracking resistance of normally solid polyethylene. However, upon the addition to the polyethylene of at least about 1.5 percent and up to about 12 percent by weight of a resinous oil-soluble phenolic condensation product, a measurable and practically desirable increase in stress-cracking resistance occurs, and with slightty higher amounts preferably from 3 to 6 percent by weight of phenolic resin the improvement in stress-cracking resistance increases up to 10,000 fold and even higher in some cases over the unmodified polyethylene.

The drying oil-soluble phenolic resins which have been found effective additives for polyethylene are the alkaline or acid catalyzed condensation products of a saturated aliphatic aldehyde, particularly formaldehyde or its polymers, e.g., paraform, and an alkyl or aryl ortho or para-substituted phenol as exemplified by the cresols, xylenols, ortho or para tertiary butyl phenol, ortho or p-tertiary amyl phenol, sec-octyl-phenols, ortho or para cyclohexyl phenol, and ortho or p-phenyl phenol.

For a more detailed compilation of the oil-soluble phenolic resins, reference is made to the paper by V. H. Turkington and Ivey Allen, Jr. entiled "Oil-Soluble Phenolic Resins—Influence of Substituents on Properties" Industrial and Engineering Chemistry, 33, No. 8, August 1941, pp. 966–971.

Preparation of oil-soluble phenolic resins is described in numerous patents, among which are the following:

British Patent 345,276 to Drummond, et al.
British Patent 401,290 to Hill, et al.
British Patent 411,442 to Bakelite Corp.
United States Patents 1,800,295 and 1,996,069 to Honel
United States Patents 1,988,615; 2,017,877; 2,173,346; and 2,375,964 to Turkington et al.
United States Patents 2,171,914 and 2,174,819 to Butler The commercial oil-soluble phenolic resins are usually brittle solids at ordinary temperature but may also be obtained as soft viscous to low melting point solids. Regardless of the physical form of the phenolic resins, their homogeneous incorporation into a normally solid polyethylene is dependent upon heating the polyethylene to a fluid plastic state while being mixed with the phenolic resin, as for example by subjecting the polyethylene to the action of a heated Banbury mixer or heated mixing rolls, or heated extruders whereby the phenolic resin readily disperses homogeneously in the melted polyethylene.

Preferably a suitable antioxidant is included in the polyethylene prior to or during the mixing operation. As suitable antioxidants for polyethylene there can be used phenols having a molecular weight of at least 350 or non-primary aromatic amines as described in British Patent 571,943 to Imperial Chemical Industries; mixtures of phenyl-α-naphthylamine and diphenyl-p-phenylene diamine as disclosed in British Patent 598,891 to Western Electric Co.; diphenyl-amine as disclosed in U.S. Patent 2,543,329 to Myers; 2,4,6-trialkyl substituted phenols as disclosed in U.S. Patent 2,801,225 to Harding; thiobisphenol and alkyl substituted thiobisphenols, including the sulfides of dialkyl substituted phenols as disclosed in Australian Patent 4410/54 to Monsanto Chemical Co.; and 2,6-dialkyl phenols as described in U.S. Patent 2,836,517 to Kolka et al.

The amount of antioxidant required is ordinarily within the limits hitherto recommended for the specific antioxidant. In general, the suggested amounts range from as little as 0.001 percent to as much as 5 percent on the weight of the polyethylene, but in most cases about 0.025 percent to 0.1 percent by weight usually suffices to impart sufficient resistance to oxidation without unduly affecting the electrical properties of the polyethylene.

The carbon black used as a co-additive with the phenolic resin includes any of the common blacks, such as acetylene, channel, or lamp black. Adequate dispersion of the carbon black into the polyethylene is essential to obtain maximum protection of the polyethylene composition against weather effects. Effective methods for satisfactorily dispersing carbon black into polyethylene are well known in the art (cf. pages 51–53 of "Polyethylene" by Renfrew et al., published 1957 by Iliffe & Son, London). From about 1 percent to about 6 percent by weight of carbon black is ordinarily required to be present in the complete polyethylene composition.

The subsequent examples illustrate several embodiments of the practice of the invention, all parts being understood to be by weight unless otherwise indicated.

EXAMPLE 1

A polyethylene composition having excellent resistance to stress-cracking was prepared by fluxing on heated rolls a commercial normally solid polyethylene having an average molecular weight of 21,000, a density of 0.915 at 25° C., a softening temperature of 110° C. and a melt index value of 2 decigrams per minute by the method of ASTM test D–1238–52T with various quantities of carbon black, an antioxidant N,N'-diphenyl-p-phenylenediamine and a commercial oil-soluble phenolic resin, "Super Backacite 1001" which is an alkaline catalyzed resinous condensation of formaldehyde and para-tertiary butyl penol having the following reported properties: melting point, 250° C.; color, light yellow; density, 1.035–1.135. The mixing temperature of the composition averaged between 115° C.–150 ° C. Upon obtaining a visibly uniform hot plastic sheet on the rolls, usually within 5 to 15 minutes mixing time, the sheet was removed, cooled, and then granulated to molding material size particles. Each granulated composition was compression molded at 175° C. and under a pressure of 5000 p.s.i. into 8 inch square plaques having a thickness of 0.125 inch. The plaques were then cut by a sharp blanking die into specimens 1.5 by 0.5 inches. The specimens were tested for stress-cracking resistance by immersion in Igepal CA–630 which is an alkyl aryl polyethylene glycol manufactured by General Dyestuff Corporation, New York and is well known stress-cracking reagent. The test procedure employed corresponded to that described in ASTM Bulletin, pp. 25–26, December 1956. In Table I there is set forth the stress-cracking results of the various specimens, the data being obtained from exposure of 20 samples of each specimen.

Table I

| Specimen No. | Percent Carbon Black | Percent Antioxidant | Percent Super Beckacite 1001 | Crack Resistance, F50 [1] Hours |
|---|---|---|---|---|
| 1 | 0.05 | | | 1.6 |
| 2 | 0.91 | | | 2.5 |
| 3 | 2.5 | | | 1.5 |
| 4 | | 0.025 | | 1.0 |
| 5 | | 0.10 | | 0.8 |
| 6 | | | 0.5 | 0.2 |
| 7 | | | 1.5 | 0.2 |
| 8 | | | 4.5 | 0.1 |
| 9 | 1.0 | 0.035 | | 1.5 |
| 10 | 2.5 | 0.075 | | 0.7 |
| 11 | | 0.025 | 4.5 | 80 |
| 12 | | 0.040 | 4.5 | >1,500 |
| 13 | | 0.050 | 4.5 | 1,320 |
| 14 | | 0.100 | 4.5 | 54 |
| 15 | 0.18 | | 4.5 | >1,500 |
| 16 | 0.48 | | 4.5 | >1,500 |
| 17 | 1.37 | | 4.5 | >1,500 |
| 18 | 1.75 | 0.025 | 4.5 | >1,500 |
| 19 | 2.25 | 0.05 | 4.5 | >1,500 |
| 20 | 2.50 | 0.075 | 4.5 | >1,500 |
| 21 | | | | 0.4 |

[1] Designates the time in hours when 50 percent of the test specimens fail by crack developments.

According to the data set forth in Table I, it is seen that carbon black as the sole additive (specimens 1, 2, and 3) has no significant effect in changing the stress crack resistance of a wholly unmodified polyethylene (specimen 21).

Similarly, polyethylene containing only an antioxidant (specimens 4 and 5) exhibits practically the same crack resistance as unmodified polyethylene (specimen 21).

The data also demonstrates that the incorporation of an oil-soluble phenolic resin as the sole additive in polyethylene (specimens 6, 7, and 8) does not change the stress-cracking resistance from that exhibited by unmodified polyethylene.

Synergistic effects as regards improvements in stress-cracking resistance are obtained when the polyethylene contains not only a phenolic resin, but either an antioxidant (specimens 11, 12, 13, and 14) or a carbon black (specimens 15, 16, and 17), or both carbon black and antioxidant (specimens 18, 19, and 20).

EXAMPLE 2

A normally solid polyethylene (density 0.916 at 25° C. and melt index 1.6) was hot-compounded in a Banbury-type mixer at a temperature up to 140° C. for 4 minutes with carbon black and an antioxidant, N,N'-diphenyl-p-phenylenediamine in the manner described in Example 1 to yield a moldable composition containing 2½ percent by weight carbon black and 0.075 percent by weight antioxidant. Part of this composition hereinafter referred to as Sample A was compression molded into plaques from which test bars were cut for testing stress-cracking resistance as described in Example 1. This remaining part of the composition hereinafter referred to as Sample B was hot-mixed on the rolls with a 4.5 percent by weight quantity of "Super Backacite 1001" oil-soluble phenolic resin and after mixing was cooled and granulated. The granules were hot-molded into plaques from which test bars were made as described for Sample A. All test bars were physically tested according to standard procedures. Table II sets forth the test data.

Table II

| | Sample A | Sample B |
|---|---|---|
| Melt Index, Gms./10 min., ASTM D–1338–52T | 1.50 | 1.53 |
| Specific Gravity according to method described in Journal of Polymer Science, 21, 144 (1956) | 0.930 | 0.931 |
| Elongation, percent | 953 | 832 |
| Tensile Strength, p.s.i., ASTM D–412–51T | 1,606 | 1,780 |
| Low Temperature Brittleness, ° C., ASTM D–746–55T | −95 | −82 |
| Crack-Resistance, F50 hours | <0.08 | >1,560 |

EXAMPLE 3

In the polyethylene composition A of Example 2 containing the carbon black and the antioxidant there was incorporated in individual portions thereof by the previously described hot-milling process various commercial drying oil soluble phenolic resins, whereby each portion contained a 4.5 percent by weight amount of the phenolic resin. The milled portions after cooling and granulation were formed into test specimens for determination of their stress crack resistance. The data set forth in subsequent Table III illustrates the improvement obtained in stress-cracking.

Table III

| Additive: | Stress-crack resistance F50 in hours |
|---|---|
| Commercial phenolic resin A | >672 |
| Commercial phneloic resin B | >744 |
| Commercial phenolic resin C | >744 |
| Commercial phenolic resin D | >576 |
| Commercial phenolic resin E | >552 |

Phenolic resin "A" is an alkaline catalyzed commercial "heat reactive" resinous condensation product of para-tertiary butyl phenol and formaldehyde which is soluble in drying oils, such as linseed oil and tung oil, has a softening point by the ball and ring method from 195° F. to 210° F. and a specific gravity at 20° C. of 1.105.

Phenolic resin "B" is an alkaline catalyzed heat reactive resinous condensation product of formaldehyde with para-tertiary amyl phenol and para phenyl phenol which is soluble in drying oils, has a softening point by the ball and ring method between 180° F. and 200° F., and a specific gravity at 20° C. of 1.175.

Phenolic resin "C" is an acid catalyzed non-heat reactive condensation product of para-tertiary amyl phenol and formaldehyde which is soluble in drying oils, has a softening point by the ball and ring method between 190° F. and 210° F. and a specific gravity at 20° C. of 1.055.

Phenolic resin "DD" is an acid catalyzed, non-heat reactive resinous condensation product of para-tertiary butyl phenol and formaldehyde which is soluble in drying oils, has a softening point by the ball and ring method between 290° F. and 315° F. and a specific gravity at 20° C. of 1.08.

Phenolic resin "E" is an acid catalyzed, non-heat reactive resinous condensation product of para-tertiary butyl phenol and formaldehyde which is soluble in drying oils, has a softening point by the ball and ring method between 250° F. and 280° F. and a specific gravity at 20° C. of 1.04.

The polyethylene compositions of the invention are particularly useful as extrusion coatings on wire in the production of insulated wires and cables having in service use superior resistance to stress-cracking than unmodified polyethylene.

Although the invention has been herein shown and described in what is considered to be most practical and preferred embodiments, it is recognized that departures may be made therefrom within the scope of the invention, which is not limited to the details herein disclosed, but is to be accorded the full scope of the appended claims, so as to embrace any and all equivalent compositions and process for producing such compositions.

What is claimed is:

1. Polyethylene characterized by resistance to stress-cracking consisting essentially of a normally solid polyethylene in admixture with from 1.5 through 12 percent by weight of said polyethylene of a drying oil soluble phenol-formaldehyde resinous condensation product and in further admixture with at least one additive selected from the group consisting of a quantity of carbon black equal to from 1 through 6 percent by weight of the quantity of said polyethylene and a quantity of a diphenyl amine equal to at least 0.001 percent by weight of the quantity of said polyethylene.

2. Polyethylene characterized by resistance to stress-cracking consisting essentially of a normally solid polyethylene in admixture with from 1.5 through 12 percent by weight of said polyethylene of a drying oil soluble phenol-formaldehyde resinous condensation product and in further admixture with a quantity of a carbon black equal to from 1 through 6 percent by weight of the quantity of said polyethylene.

3. Polyethylene characterized by resistance to stress-cracking consisting essentially of a normal solid polyethylene in admixture with from 1.5 through 12 percent by weight of said polyethylene of a drying oil soluble phenol-formaldehyde resinous condensation product and in further admixture with a quantity of a diphenyl amine equal to at least 0.001 percent by weight of the quantity of said polyethylene.

4. Polyethylene characterized by resistance to stress-cracking consisting essentially of a normally solid polyethylene in admixture with from 1.5 through 12 percent by weight of said polyethylene of a drying oil soluble phenol-formaldehyde resinous condensation product and in further admixture with a quantity of a diphenyl amine equal to from 0.1 through 5 percent by weight of the quantity of said polyethylene.

5. Polyethylene characterized by resistance to stress-cracking consisting essentially of a normally solid polyethylene in admixture with from 1.5 through 12 percent by weight of said polyethylene of a drying oil soluble alkali-substituted phenol-formaldehyde resinous condensation product and in further admixture with at least one additive selected from the group consisting of a quantity of a carbon black equal to from 1 through 6 percent by weight of the quantity of said polyethylene and a quantity of a diphenyl amine equal to at least 0.001 percent by weight of the quantity of said polyethylene.

6. Polyethylene characterized by resistance to stress-cracking consisting essentially of a normally solid polyethylene in admixture with from 1.5 through 12 percent by weight of said polyethylene of a drying oil soluble para-tertiary butyl phenol-formaldehyde resinous condensation product and in further admixture with at least one additive selected from the group consisting of a quantity of a carbon black equal to from 1 through 6 percent by weight of the quantity of said polyethylene and a quantity of a diphenyl amine equal to at least 0.001 percent by weight of the quantity of said polyethylene.

7. Polyethylene characterized by resistance to stress-cracking consisting essentially of a normally solid polyethylene in admixture with from 1.5 through 12 percent by weight of said polyethylene of a drying oil soluble para-tertiary amyl phenol-formaldehyde resinous condensation product and in further admixture with at least one additive selected from the group consisting of a quantity of a carbon black equal to from 1 through 6 percent by weight of the quantity of said polyethylene and a quantity of a diphenyl amine equal to at least 0.001 percent by weight of the quantity of said polyethylene.

8. Polyethylene characterized by resistance to stress-cracking consisting essentially of a normally solid polyethylene in admixture with from 1.5 through 12 percent by weight of said polyethylene of a drying oil soluble phenol-formaldehyde resinous condensation product and in further admixture with a quantity of N,N'-diphenyl-p-phenylenediamine equal to at least 0.001 percent by weight of the quantity of said polyethylene.

9. Polyethylene characterized by resistance to stress-cracking consisting essentially of a normally solid polyethylene in admixture with from 3 through 6 percent by weight of said polyethylene of a drying oil soluble phenol-formaldehyde resinous condensation product and in further admixture with at least one additive selected from the group consisting of a quantity of a carbon black equal to from 1 through 6 percent by weight of the quantity of said polyethylene and a quantity of a diphenyl amine equal to at least 0.001 percent by weight of the quantity of said polyethylene.

10. Polyethylene characterized by resistance to stress-cracking consisting essentially of a normally solid polyethylene in admixture with from 3 through 6 percent by weight of said polyethylene of a drying oil soluble phenol-formaldehyde resinous condensation product and in further admixture with a quantity of a carbon black equal to from 1 through 6 percent by weight of the quantity of said polyethylene.

11. Polyethylene characterized by resistance to stress-cracking consisting essentially of a normally solid polyethylene in admixture with from 3 through 6 percent by weight of said polyethylene of a drying oil soluble phenol-formaldehyde resinous condensation product and in further admixture with a quantity of a diphenyl amine equal to at least 0.001 percent by weight of the quantity of said polyethylene.

12. Polyethylene characterized by resistance to stress-cracking consisting essentially of a normally solid polyethylene in admixture with from 3 through 6 percent by weight of said polyethylene of a drying oil soluble phenol-formaldehyde resinous condensation product and in further admixture with a quantity of a diphenyl amine equal to from 0.1 through 5 percent by weight of the quantity of said polyethylene.

References Cited by the Examiner

UNITED STATES PATENTS

| | | | |
|---|---|---|---|
| 2,240,582 | 5/1941 | Sparks | 260—43 |
| 2,569,540 | 10/1951 | Selby | 260—43 |
| 2,656,297 | 10/1953 | Davis et al. | 260—43 |
| 2,731,443 | 1/1956 | Forman | 260—810 XR |
| 2,894,925 | 7/1959 | Morris | 260—43 |
| 2,968,641 | 1/1961 | Roberts et al. | 260—45.95 |
| 2,985,617 | 5/1961 | Salyer et al. | 260—45.7 |

(Other references on following page)

OTHER REFERENCES

Plastics, pages 12 and 29 (December 1948), published at Chicago, Illinois.

Raff et al.: "Polyethylene" Interscience, N.Y., 1956, pp. 103–108.

MORRIS LIEBMAN, *Primary Examiner.*

ALPHONSO D. SULLIVAN, MILTON STERMAN, GEORGE D. MITCHELL, *Examiners.*

R. W. GRIFFIN, H. W. HAEUSSLER, A. KOECKERT, K. B. CLARKE, *Assistant Examiners.*